United States Patent

Huang et al.

[11] Patent Number: 6,080,472
[45] Date of Patent: Jun. 27, 2000

[54] POROUS POLYTETRAFLUOROETHYLENE MOLDED ARTICLE

[75] Inventors: James Huang; William Chou; David Chou; Jenn-Yuh Kau, all of Taichung; Yui-Whei Cheng-Yang, Hsin Chu; Woh-Jer Lee, Taichung, all of Taiwan

[73] Assignee: Yeu Ming Tai Chemical Ind. Co., Ltd., Taichung, Taiwan

[21] Appl. No.: 09/103,722

[22] Filed: Jun. 24, 1998

[30] Foreign Application Priority Data

Nov. 27, 1979 [JP] Japan ..................... 9-326658

[51] Int. Cl.$^7$ ........................... B32B 3/00
[52] U.S. Cl. ................. 428/315.5; 428/319.1; 428/319.7; 428/910; 428/903
[58] Field of Search ........................... 428/315.5

[56] References Cited

U.S. PATENT DOCUMENTS

| | | | |
|---|---|---|---|
| 3,953,566 | 4/1976 | Gore | 264/288 |
| 4,187,390 | 2/1980 | Gore | 174/102 |
| 4,598,011 | 7/1986 | Bowman | 428/221 |
| 4,985,296 | 1/1991 | Mortimer, Jr. | 428/220 |
| 5,110,526 | 5/1992 | Hayashi et al. | 264/127 |
| 5,217,797 | 6/1993 | Knox et al. | 428/246 |
| 5,234,751 | 8/1993 | Harada et al. | 428/224 |
| 5,349,896 | 9/1994 | Delaney, III et al. | 92/98 |
| 5,374,473 | 12/1994 | Knox et al. | 428/218 |
| 5,466,509 | 11/1995 | Kowligi et al. | 428/141 |
| 5,658,960 | 8/1997 | Dolan | 521/57 |
| 5,698,300 | 12/1997 | Wimmer et al. | 428/212 |
| 5,911,926 | 6/1999 | Harada et al. | 264/41 |

Primary Examiner—Ellen M. McAvoy
Attorney, Agent, or Firm—Sughrue, Mion, Zinn, Macpeak & Seas, PLLC

[57] ABSTRACT

To provide a porous polytetrafluoroethylene sheet which has excellent cold flow resistance and is used suitably for gaskets and a highly densified polytetrafluoroethylene sheet which has high tensile strength and flex life and is used suitably for diaphragms. The porous polytetrafluoroethylene sheet is produced from a polytetrafluoroethylene material having a microstructure of nodes interconnected by fibrils and has MTS of from 3,000 to 12,000 psi and C.I. of 0.02 to 0.20 g/cc/psi. The highly densified polytetrafluoroethylene sheet is produced by compression-molding the porous polytetrafluoroethylene sheet and then sintering completely. The porous polytetrafluoroethylene sheet is also laminated with a sheet of other material to provide a composite polytetrafluoroethylene molded article.

21 Claims, 2 Drawing Sheets

POROUS POLYTETRAFLUOROETHYLENE MOLDED ARTICLE

BACKGROUND OF THE INVENTION

The present invention relates to a porous polytetrafluoroethylene (hereinafter referred to as "PTFE") molded article, and a composite PTFE molded article and a highly densified PTFE sheet which are obtained from the porous PTFE molded article, and particularly relates to the porous PTFE molded article having excellent chemical resistance and excellent durability to deformation in a wide range of temperature, especially under the conditions of high temperature and high load, and the processed (densified) article obtained therefrom.

Since the porous PTFE molded articles have excellent chemical resistance and high tensile strength, they have been used suitably for many applications such as sealing materials, gaskets, etc. for processing equipment and pipings in the fields of chemicals, foods, and semiconductors; filters for filtrating various gases and liquids; clothes, sheets for medical use, etc. having gas permeability, water-impermeability and water repelling property.

Such porous PTFE molded articles are well-known. Particularly U.S. Pat. No. 4,598,011 discloses a porous PTFE molded article having a high matrix tensile strength, a relatively large pore size and a large porosity. The porous PTFE molded article disclosed therein is a molded article comprising a porous material having a microstructure characterized by nodes interconnected by fibrils and has an average MTS value of not less than 15,000 psi (hereinafter referred to as "Molded Article a"); a molded article having average MTS and C.I. values within the range surrounded by the point A (MTS=3,000, C.I.=0.4), the point B (MTS=12,000, C.I.=0.4), the point C (MTS=16,000, C.I.=0.2) and the point D (MTS=25,000, C.I.=0.2) in FIG. 1 (corresponding to FIG. 3 of the above-mentioned US patent) described later (hereinafter referred to as "Molded Article b"); or a molded article having an average MTS of not less than 3,000 and EBP of not more than 4 (hereinafter referred to as "Molded Article c"). The meanings of MTS, C.I. and EBP are explained later.

The above-mentioned porous PTFE molded articles have more enhanced tensile strength, cold flow resistance and porosity as compared with conventional ones, but in case of the use for gasket which is one of main applications of the porous PTFE molded articles, there arise the following problems.

① Enough sealing effect cannot be obtained unless a relatively high stress or torque is applied for sealing.

② In case of use under high stress, partial deformation in a specific direction occurs due to anisotropic cold flow. Particularly in case of use at high temperature, deformation in a specific direction becomes remarkably large.

An object of the present invention is to solve the above-mentioned problems and to provide a porous PTFE molded article which is less anisotropically deformable even at high temperature and high load, and if deformed, the deformed direction is not specific.

Another object of the present invention is to provide a composite molded article produced by laminating the porous PTFE molded article and other material.

Other object of the present invention is to provide a highly densified PTFE molded article or sheet which is produced by pressing and then sintering the porous PTFE molded article or sheet.

SUMMARY OF THE INVENTION

The present invention relates to the porous PTFE molded article which comprises a porous PTFE material having a microstructure characterized by nodes interconnected by fibrils and has MTS value of from 3,000 to 12,000 psi and C.I. of from 0.02 to 0.20 g/cc/psi.

It is preferable that EBP value of the porous PTFE molded article is in the range of from 5 to 16 psi.

Further it is preferable that the porous PTFE molded article is in the form of sheet and has a MTS ratio (hereinafter referred to as "L/T") of within 1.0±0.2, which is a ratio of MTS of the two expanding directions, i.e. biaxial orthogonal expanding directions.

The present invention further relates to the composite PTFE molded article comprising a multilayered article, which is composed of the porous PTFE sheet and a perfluorocarbon resin sheet having a dense structure and/or a metal or graphite sheet.

The present invention further relates to the highly densified PTFE sheet obtained by:

pressing the porous PTFE sheet and then sintering at a temperature of not less than the melting point of PTFE and not more than its thermal decomposition temperature.

It is preferable in the present invention that the highly densified PTFE sheet is obtained by:

pressing the porous PTFE sheet;

sintering the pressed sheet at a temperature within a range of not less than the melting point of PTFE and lower than its thermal decomposition temperature; and then re-pressing the sintered sheet at a temperature of not less than 280° C.

It is preferable in the present invention that the highly densified PTFE sheet is obtained by pressing, at a temperature within a range of not less than the melting point of PTFE and lower than its thermal decomposition temperature, the porous PTFE sheet.

It is preferable in the present invention that in the highly densified PTFE sheet, the porous PTFE material is a mixture of PTFE and modified PTFE.

It is preferable in the present invention that the highly densified PTFE sheet has a specific gravity of 2.10 to 2.25 g/cc.

DETAILED DESCRIPTION OF THE INVENTION

Figure 1:
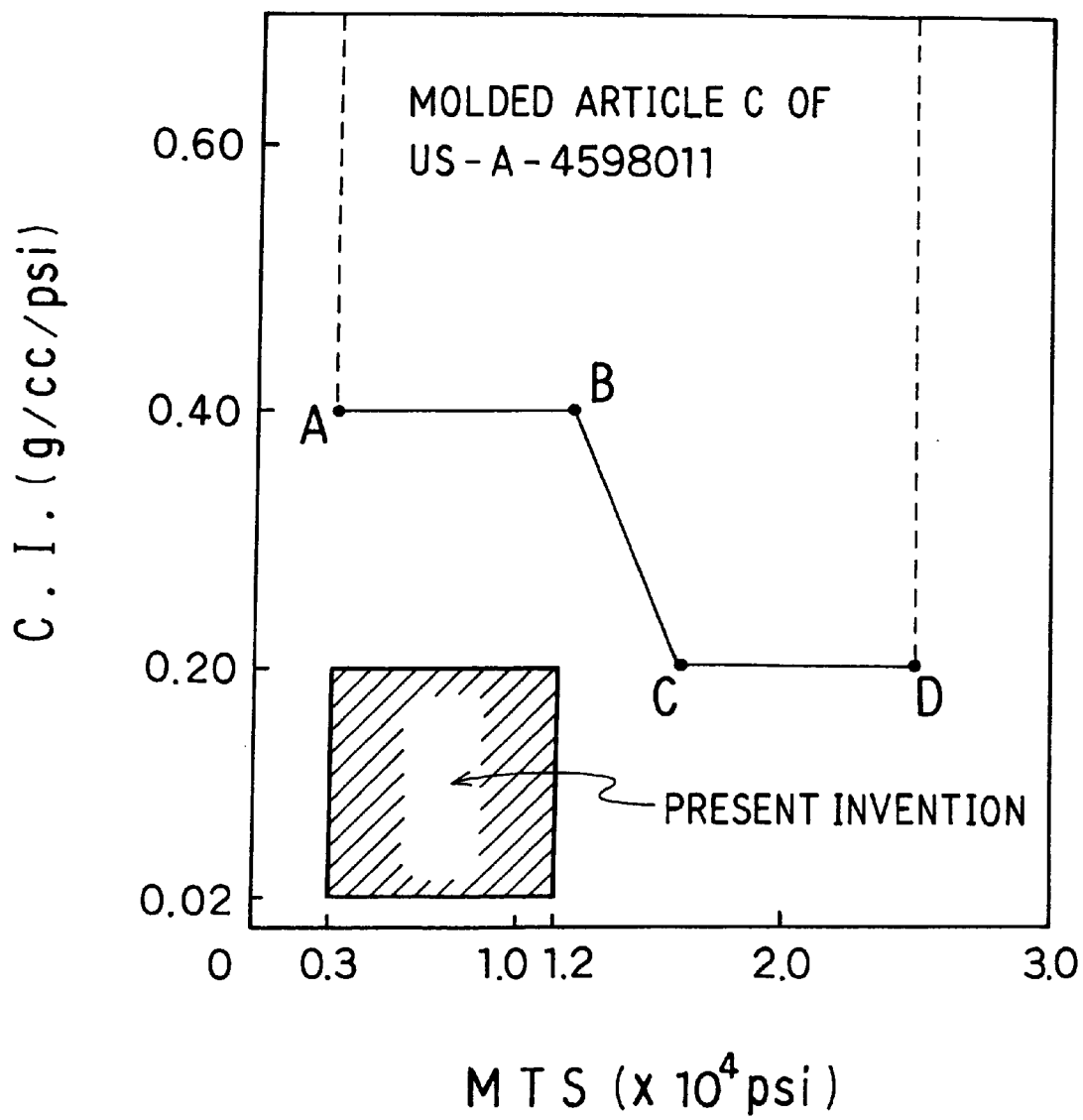
FIG. 1 is a graph showing a difference in physical properties between the porous PTFE molded articles of the present invention and the porous PTFE molded articles of prior arts.

The meanings of MTS, EBP and C.I. are first explained below.

MTS (unit: psi) is an abbreviation of "Matrix Tensile Strength" and is calculated according to the following equation:

$$MTS = TS \times \frac{d\, PTFE}{d\, \text{Porous } PTFE}$$

TS: Measured tensile strength of porous PTFE molded article (psi)
d PTFE: Specific gravity of densified PTFE (provided that d=2.20) (g/cc)
d Porous PTFE: Measured specific gravity of porous PTFE molded article (g/cc)

An average MTS is an average value of the measured MTS in one expanding direction in case of the uniaxially expanded porous PTFE molded article (measured with respect to 5 samples). In case of a biaxially orthogonally expanded porous PTFE molded article, it is an average value of the measured MTS in two expanding directions (measured with respect to 5 samples).

The tensile strength and specific gravity of the porous PTFE molded article are measured by the following methods.
(Tensile strength)
A sample of ½ inch wide (12.5 mm) x 7 inch long (175 mm) is made by using an expanded and heat-set porous PTFE article, and the width and length of the sample are measured accurately with calipers and a dial gauge, respectively.

The sample is set on a tension machine so that a distance of two fasteners is 5 inches (125 mm). Then the sample is stretched at a cross head speed of 10 inches/min, and the maximum load at break is measured. The tensile strength (TS) is calculated according to the following equation:

$$TS = \frac{F}{b \times t}$$

F: Maximum load at break (pound)
b: Width of sample (inch)
t: Thickness of sample (inch)
(Specific gravity)
In the same manner as in the measurement of the tensile strength, a sample of 15 mm wide x 250 mm long is made, and the length, width and thickness of the sample are measured accurately with a straight metal scale, calipers and a dial gauge, respectively. After the sample is folded up and weighed with a chemical balance (sensibility: 0.1 mg), the specific gravity is calculated according to the following equation:

$$d\, \text{Porous } PTFE = \frac{W}{l \times b \times t}$$

W: Weight (gram)
l, b and t: Length, width and thickness, respectively

MTS shows a substantial strength of the structure of nodes interconnected by fibrils in the porous PTFE molded article. Namely when apparent tensile strength (measured TS) is not changed but a calculated MTS value becomes larger, it means that the structure itself becomes stronger even if porosity of the porous molded article becomes larger (in other words, even if the specific gravity of the porous article becomes lower).

EBP (unit: psi) is an abbreviation of "Ethanol Bubbling Point". EBP is measured according to the method described in ASTM F316-80. EBP is a minimum air pressure applied to a sample of a porous material saturated with ethanol, where air begins to pass through the sample.

EBP is one of characteristics determining pore size of porous PTFE molded article. A sample having higher EBP has a smaller pore size.

C.I. is an abbreviation of "Coarseness Index", and is calculated according to the following equation:

$$C.I. = \frac{d\, \text{Porous } PTFE}{EBP}$$

C.I. is one of characteristics determining coarseness of porous molded article, and its unit is g/cc/psi. When comparing porous molded articles having the same specific gravity, a porous article having larger C.I. is a coarse porous article in view of porosity.

The porous PTFE molded article of the present invention has a microstructure of nodes interconnected with fibrils. This microstructure is basically the same as that of the porous PTFE molded article disclosed in U.S. Pat. No. 4,598,011 and shown diagrammatically in FIG. 1 thereof.

However, though the porous PTFE molded articles of the US patent are three kinds of Molded Articles a, b and c having MTS, C.I. and EBP as mentioned above, the porous PTFE molded article of the present invention has MTS of 3,000 to 12,000 psi and C.I. of 0.02 to 0.20 g/cc/psi, and preferably EBP of 5 to 16 psi, and is different from those of the prior molded articles as mentioned below.

Namely Molded Article a has MTS of not less than 15,000 psi and is explicitly different from the present invention. Also Molded Article b has MTS and C.I. within the region surrounded by the point A (MTS=3,000, C.I.=0.4), the point B (MTS=12,000, C.I.=0.4), the point C (MTS=16,000, C.I.=0.2) and the point D (MTS=25,000, C.I.=0.2) in FIG. 1, and is quite different from the molded article of the present invention (hatched region in FIG. 1). Further Molded Article c has MTS of not less than 3,000 psi and EBP of not more than 4.0 psi, and differs quitely from the molded article of the present invention which has EBP of 5 to 16 psi.

The porous PTFE molded article of the present invention is a novel one as mentioned above, and has specific physical properties and thereby is excellent in cold flow resistance, etc. mentioned below.

For example, in case of the use of a porous PTFE molded article as a gasket, a high stress is permanently applied thereto in a wide temperature range. If cold flow of the gasket occurs, it must be exchanged to new one. The cold flow occurs on the gaskets of the prior arts easily and moreover tends to occur in a specific (anisotropic) direction, and thus a life of such gaskets is short as mentioned above. On the contrary according to the present invention, not only cold flow hardly occurs but also the direction of cold flow is isotropic even if it occurs. Therefore gases and liquids sealed by the gasket do not leak to a specific direction, and the gasket has a longer life as compared with conventional gaskets. Further the gasket can be used longer continuously by slightly re-tightening it. Difference in this effect on cold flow resistance appears particularly in case of use at high temperature.

The porous PTFE molded article of the present invention can be formed into a film or sheet. In case of expanding in two directions, i.e. biaxial orthogonal expanding directions, it is preferable that MTS in two directions are nearly the same, namely MTS ratio is within 1.0±0.2. When the MTS ratio is within the mentioned range, the cold flow becomes most isotropic.

The porous PTFE molded article of the present invention is useful for gaskets, filters, etc. for piping and vessel of processing plants of chemicals, semiconductors and foods industries, and besides for damp proof material for clothes.

The porous PTFE molded article of the present invention can be produced, for example, by the following five steps:
(1) Step for paste-extruding PTFE fine powder An extrudate in the form of cylinder, angular rod or sheet is produced by extruding a mixture in the form of paste which comprises a PTFE fine powder prepared by emulsion polymerization and an extrusion aid such as naphtha The PTFE fine powder is a powder obtained by coagulating an aqueous dispersion of a polymer prepared by emulsion polymerization to separate the polymer and then drying the separated polymer. The polymer comprises tetrafluoroethylene (TFE) homopolymer or a copolymer (modified PTFE) of TFE and a small amount of perfluoro(alkyl vinyl ether) or hexafluoropropylene.

The modified PTFE used in the present invention is a not melt-processable PTFE to which the above-mentioned comonomer was introduced. An amount of the comonomer is usually not more than 1% by weight.

In the present invention, while PTFE homopolymer may be used solely, a mixture of PTFE homopolymer and modified PTFE is preferable from the viewpoints of enhancement of degree of sintering, characteristics of a highly densified molded article and productivity. It is preferable that an amount of the modified PTFE is not less than 5% by weight and not more than 30% by weight, more preferably not more than 20% by weight. As the modified PTFE to be blended with PTFE homopolymer, preferable are a perfluoro(alkyl vinyl ether)-modified PTFE or hexafluoropropylene-modified PTFE. It is preferable that an amount of the modified PTFE is not less than 5% by weight and not more than 30% by weight, particularly not more than 20% by weight. Mixing of the PTFE homopolymer and the modified PTFE can be effected by various methods. Particularly a fine powder of the mixture of PTFE homopolymer and modified PTFE can be obtained by mixing dispersions of the PTFE homopolymer and the modified PTFE, and then coagulating and drying.

(2) Step for calendering extruded article

The extruded article obtained in Step (1) is calendered with calender rolls, etc. in the extruding direction or in the direction orthogonal to the extruding direction, then formed into a sheet. (3) Step for removing extrusion aids The sheet obtained in Step (2) is subjected to heating or extracting with the use of a solvent such as trichloroethane or trichloroethylene to remove the extrusion aids.

(4) Step for stretching

The sheet containing no extrusion aid obtained in Step (3) is stretched uniaxially or biaxially. The sheet may be preheated at about 250° C. before stretching. In case of the biaxial stretching, the stretching in two directions may be carried out separately or at the same time.

Since the magnification of stretching influences EBP and MTS of the stretched porous article, it should be selected cautiously. In general the magnification by area is from 300 to 1,000%, preferably from 400 to 800%.

(5) Step for heat setting

The stretched article obtained in Step (4) is heat-treated at a temperature slightly higher than the melting point of PTFE (about 327° C.) and lower than its decomposition temperature, i.e. at 340° to 380° C. for a relatively short period of time (5 to 30 minutes) for heat setting.

The above-mentioned method is similar to a conventional method for producing a porous PTFE molded article. However according to the present invention, by decreasing the orientaion of the PTFE resin as low as possible particularly in Step (1) for paste-extruding, a molded article having specific physical properties mentioned above can be obtained. Such a decrease in the orientation can be achieved by suitable selections of a reduction ratio in the paste extrusion (preferably not more than 100:1, usually 20 to 60:1), a weight ratio of PTFE to extrusion aid (usually 77/23 to 80/20) and a die angle of the extruder (usually about 60°), etc.

Further the present invention relates to a composite molded article comprising a multilayered article composed of the above-mentioned porous PTFE sheet and a layer of other material.

Examples of the other material are, for instance, densed (non-porous) perfluorocarbon resins such as PTFE, tetrafluoroethylene-perfluoro(alkyl vinyl ether) copolymer (PFA) and tetrafluoroethylene-hexafluoropropylene copolymer (FEP); metals such as titanium and stainless steel; graphite; etc. These materials are in the form of sheet such as plate or mesh. The multilayered article may be produced by laminating them with an adhesive, pressing the porous PTFE sheet as a material in the form of mesh, or other method. The thickness of each layer or sheet may be optionally selected depending on a size of a gasket which is one of main applications of the composite article, degree of applied pressure (stress), kind of gases or liquids to be sealed, etc.

Examples of the preferred composite molded article are, for instance, the porous PTFE sheet/densed PTFE sheet or PFA sheet, the porous PTFE sheet/titanium foil, the porous PTFE sheet/stainless steel foil or sheet, the porous PTFE sheet/stainless steel foil/graphite, etc. The composite molded articles are not limited to them, and any combinations may suffice. The material for composite molded article may comprise one material or two or more materials, and there is no limitation to the number of layers. However it is preferable to use the porous PTFE sheet as the both outermost layers.

The use of composite article exhibits effects of remarkably improving the strength, dimensional stability and cold flow resistance as the gasket, and the composite molded article can be suitably used for gaskets which are used particularly under high stress.

The present invention further relates to the highly densified PTFE sheet which is a highly processed article of the porous PTFE molded article.

The highly densified PTFE sheet can be obtained by compression-molding the stretched article obtained in Step (4) or the heat-set article obtained in Step (5) (pressure: 50 to 400 kg·f/cm$^2$, room temperature, holding time: 10 to 20 minutes); and then sintering at a temperature within a range of not less than the melting point of PTFE (about 327° C.) and not more than its thermal decomposition temperature (about 400° C.), preferably at 350° to 380° C. for 30 to 60 minutes (in case of a thickness of 1 to 2 mm). Also in order to further enhance density and reduce shrinkage, the sintered article may be pressed again at a temperature of not less than 280° C. preferably not more than the melting point (about 327° C.). Also the highly densified PTFE sheet can be obtained by pressing and sintering by carrying out pressing and heating at the same time under the above-mentioned pressure and temperature conditions. Further it is more preferable to start with the stretched article obtained in Step (4) from the viewpoints of easiness of compression-molding, high densification and shortening of the manufacturing process.

The highly densified PTFE sheet is not porous substantially, and has a specific gravity of from 2.10 to 2.25 g/cc, preferably from 2.15 to 2.20 g/cc.

In general highly densified PTFE sheets are conventionally produced by compression-molding of a molding powder prepared by suspension polymerization of TFE and then sintering the pre-formed sheet obtained. Those conventional sheets, however, have such a problem that they are low in flex life and tensile strength depending on application fields.

The highly densified PTFE molded article of the present invention is, in contrast, excellent in, particularly tensile strength and flex life in addition to excellent chemical resistance, oil resistance, thermal resistance, low friction property and non-sticking property which are inherent properties of PTFE. The highly densified PTFE sheet of the present invention exhibits particularly excellent function as diaphragm and sealing material for pumps and valves when used solely or laminated with other materials such as Neoprene sheet and chloroprene sheet.

The present invention is then explained by means of Examples, but is not limited to them.

EXAMPLE 1

A mixture in the form of paste comprising 80 parts by weight of a PTFE fine powder prepared by emulsion polymerization and 20 parts by weight of naphtha was extruded with an extruder (reduction ratio at extruding: 56:1) to give a rod-like extrudate of 18 mm diameter. The rod-like extrudate was calendered with calender rolls in the same direction as the extruding direction to give a sheet-like article of 110 mm wide x 3.2 mm thick The calendered sheet was heated at 300° C. in an oven to remove naphtha Then the sheet was cut into 150 mm length, and immediately after preheated at 250° C. for 30 minutes, uniaxially stretched at a stretching rate of 300 %/second with a uniaxial stretching machine (the stretching direction is the same as the extruding direction). While maintaining the stretching conditions (stretching ratio: 200%), the sheet was heat-set at 340° C. for 15 minutes to give a porous PTFE sheet.

With respect to the obtained porous PTFE sheet (2.7 mm thick), its specific gravity (d Porous PTFE), MTS and EBP were measured by the mentioned methods, and further C.I. was calculated. Also sealability was checked by the following method. The results are shown in Table 1.

(Sealability)

Two pipes having a diameter of 29 mm (inside diameter: 25 mm) are connected with a coupling (one end of one pipe is sealed by welding, and the opposite end of another pipe is connected to a hydraulic pump and provided with a valve and a pressure gauge). A porous PTFE sheet is used as a gasket at the sealed part of the coupling. With a water pressure of 10 kg·f/cm$^2$ being applied inside the pipe, the pipe was allowed to stand for five hours. Then the pressure inside the pipe was checked to evaluate sealability.

EXAMPLE 2

Comparative Example 1

A porous PTFE molded article was obtained in the same manner as in Example 1 except that the stretching ratio was changed to 300% (Example 2) and 400% (Comparative Example 1). A specific gravity (d Porous PTFE), MTS, EBP, C.I. and sealability were determined in the same manner as in Example 1. The results are shown in Table 1.

TABLE 1

|  | Ex. 1 | Ex. 2 | Com. Ex. 1 |
| --- | --- | --- | --- |
| Stretching ratio (%) | 200 | 300 | 400 |
| Thickness (mm) | 2.7 | 2.6 | 2.2 |
| Specific gravity (d Porous PTFE) (g/cc) | 0.80 | 0.55 | 0.42 |
| Average MTS (psi) | 6,875 | 9,600 | 12,500 |
| EBP (psi) | 8 | 5 | 2 |
| C.I. (g/cc/psi) | 0.10 | 0.11 | 0.21 |
| Sealability | 10 kg · f/cm$^2$ remain unchanged | 10 kg · f/cm$^2$ remain unchanged | Decreased to 9.5 kg · f/cm$^2$ |

EXMAPLES 3 to 11

A mixture in the form of paste comprising 80 parts by weight of a PTFE fine powder prepared by emulsion polymerization and 20 parts by weight of naphtha was extruded with an extruder equipped with a rectangular cylinder and a die (reduction ratio at extruding: 24:1) to give a sheet of 240 mm wide x 5 mm thick. The sheet was cut to 240 mm length.

The extrudate was calendered with calender rolls in the direction orthogonal to the extruding direction to give a sheet-like article of 2.1 mm thick. The calendered sheet was heated at 300° C. in an oven to remove naphtha Then after preheated at 250° C. for 30 minutes, the sheet was first stretched by 100% in the same direction as the calendering direction at a stretching rate of 100%/second with the stretching machine, and with maintaining the stretching ratio, was then secondarily stretched in the direction orthogonal to the first stretching direction at a stretching rate of 100%/second, 200%/second or 300%/second. Thus the sheet was biaxially stretched (the secondary stretching ratios are shown in Table 2). While maintaining the stretching conditions, the stretched sheet was heat-set at 340° C. for 15 minutes to give a porous PTFE sheet.

With respect to the obtained porous PTFE sheet (Thickness is shown in Table 2), its specific gravity (d Porous PTFE), MTS (respective MTS in the two orthogonal directions), EBP, C.I. and sealability were determined in the same manner as in Example 1. Also the MTS ratio of the two orthogonal directions (L/T) was calculated. The results are shown in Table 2.

Comparative Example 2

A porous PTFE sheet was obtained in the same manner as in Example 11 except that the reduction ratio of the extruder at extruding was increased to about 50:1. Physical properties and sealability were determined in the same manner as in Example 1. The results are shown in Table 2.

It should be noted that as the reduction ratio is increased, degrees of fibrilation and orientation of PTFE particles become larger.

TABLE 2

|  | Examples | | | | | | | | | Comparative |
| --- | --- | --- | --- | --- | --- | --- | --- | --- | --- | --- |
|  | 3 | 4 | 5 | 6 | 7 | 8 | 9 | 10 | 11 | Example 2 |
| Stretching rate (%/sec) | 100 | 100 | 100 | 200 | 200 | 200 | 300 | 300 | 300 | 300 |
| Secondary stretching ratio (%) | 100 | 200 | 300 | 100 | 200 | 300 | 100 | 200 | 300 | 300 |
| Thickness (mm) | 1.60 | 1.44 | 1.42 | 1.58 | 1.55 | 1.35 | 1.54 | 1.52 | 1.32 | 1.55 |
| Specific gravity (g/cc) | 0.65 | 0.50 | 0.38 | 0.70 | 0.46 | 0.40 | 0.75 | 0.47 | 0.41 | 0.59 |
| EBP (psi) | 14 | 13 | 10 | 12 | 12 | 10 | 12 | 9 | 8 | 4 |
| C.I. (g/cc/psi) | 0.046 | 0.038 | 0.038 | 0.058 | 0.038 | 0.040 | 0.063 | 0.052 | 0.051 | 0.15 |
| MTS* (psi) |  |  |  |  |  |  |  |  |  |  |
| L | 6,584 | 7,628 | 8,919 | 6,338 | 7,715 | 8,687 | 5,395 | 7,643 | 8,977 | 11,150 |
| T | 7,527 | 7,759 | 9,673 | 6,570 | 8,194 | 10,122 | 5,613 | 8,310 | 9,586 | 14,200 |
| MTS ratio (L/T) | 1.14 | 1.02 | 1.08 | 1.04 | 1.06 | 1.17 | 1.04 | 1.09 | 1.07 | 1.27 |
| Sealability | No pressure change | No pressure change | No pressure change | No pressure change | No pressure change | No pressure change | No pressure change | No pressure change | No pressure change | Pressure decreased to 9.8 kg.f/cm$^2$ |

*L: MTS in the direction of first stretching
T: MTS in the direction of secondary stretching

EXMAPLE 12

The biaxially stretched sheet (1.35 mm thick) before heat-setting in Example 8 was compression-molded at a pressure of 300 kg·f/cm$^2$ and then sintered at 370° C. for one hour to give a highly densified PTFE sheet having a specific gravity of 2.18 g/cc (0.49 mm thick). Tensile strength of the obtained sheet was as large as 405 kg·f/cm$^2$.

A flex life of the sheet measured according to ASTM D2178 was over 2×10$^7$ times, which shows an excellent durability.

EXAMPLE 13

The same sample as in Example 12 was heated and pressed with a heat press machine at 370° C. at a pressure of 200 kg·f/cm$^2$ for one hour to give a highly densified PTFE sheet. The specific gravity, thickness and tensile strength of the obtained sheet were 2.20 g/cc, 0.47 mm and 420 kg·f/cm$^2$, respectively.

A flex life of the sheet measured according to ASTM D2178 was as high as 2.8×10$^7$ times.

Comparative Example 3

A PTFE molding powder prepared by suspension polymerization was compression-molded at a pressure of 300 kg·f/cm$^2$ and sintered at 370° C. for one hour to give a highly densified PTFE sheet having a specific gravity of 2.15 g/cc (0.50 mm thick). Tensile strength of the obtained sheet was 245 kg·f/cm$^2$, and a flex life of the sheet was 2.5×10$^6$ times.

EXAMPLE 14

A calendered sheet of 140 mm wide x 1.2 mm thick was obtained in the same manner as in Example 1 except that there was used as the PTFE fine powder, a blend of 95% by weight of pure PTFE and 5% by weight of modified PTFE which was modified with perfluoro(alkyl vinyl ether) of not more than 1% by weight. After removing naphtha by heating the sheet in an oven maintained at 300° C., the sheet was cut to 150 mm length, heated at 300° C. for 20 minutes and then immediately stretched by 300% at a stretching rate of 300%/second in the same direction as the extruding and calendering direction Further this first stretched sheet was cut to 150 mm length and stretched in the direction orthogonal to the first stretching direction under the same conditions as in the first stretching to give a biaxially stretched film of 0.1 mm thick.

After laminating 25 pieces of biaxially stretched films, the laminated sheet was pressed with a press machine at a pressure of 250 kg/cm$^2$ and then sintered at 360° C. for 40 minutes to give a densified PTFE sheet having a density of 2.15 g/cc.

A tensile strength of the densified sheet was 415 kg/cm$^2$ and its flex life was 4×10$^7$ times.

Since the degree of sintering of the blended PTFE polymer was improved as compared with that of pure PTFE, it was possible to sinter at a lower temperature for a shorter sintering time. This is a great advantage to produce a densified article. The degree of sintering can be judged by a period of time required for the article to become transparent.

EXAMPLE 15

The sheet which was pressed and sintered in Example 14 was pressed again at 150 kg/cm$^2$ for 30 minutes immediately after taken out from the oven. During the re-pressing, the temperature of the sheet was maintained at a temperature above 300° C.

The densified PTFE sheet thus obtained had a density of 2.17 g/cc, a tensile strength of 420 kg/cm$^2$ and a flex life of 4.2×10$^7$ times.

The pressed sheet of Example 14 shrinked by several percent during the sintering, but the sheet obtained in Example 15 less shrinked. Namely, a densified article having a desirable size can be provided only by adding one re-pressing step.

EXAMPLE 16

A biaxially stretched film having a thickness of 0.14 mm was obtained in the same manner as in Example 14 except that a blend of 90% by weight of pure PTFE and 10% by weight of modified PTFE was used.

After laminating 20 plies of the biaxially stretched films, the laminated sheet was pressed at a pressure of 220 kg/cm$^2$ and sintered at 350° C. in an oven. It took about 30 minutes until the sheet became transparent. After the sintering, the sheet was pressed again at a pressure of 130 kg/cm$^2$ at a temperature above 300° C.

The obtained densified sheet had a density of 2.16 g/cc, and its tensile strength was 410 kg/cm² and its flex life was 4.5×10⁷ times.

EXAMPLE 17

Figure 2:
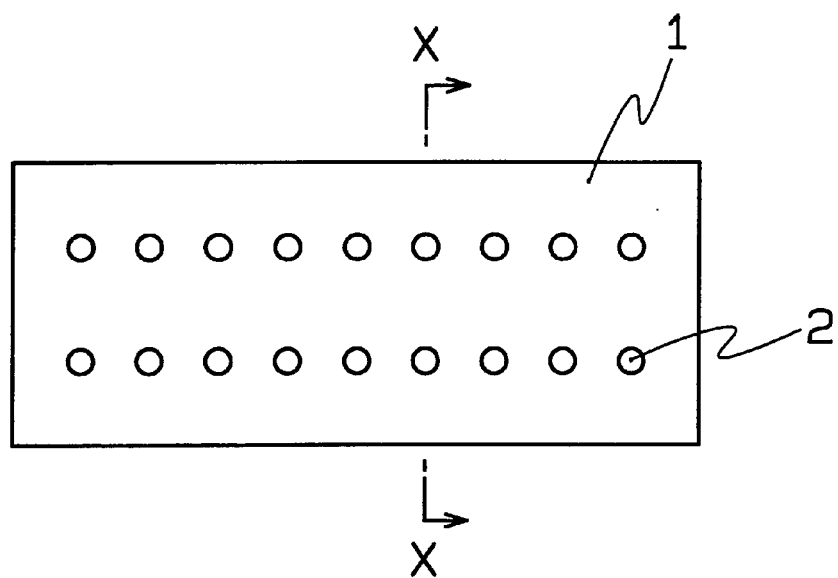
FIG. 2 is a diagrammatic plan view showing an example of a material used for the composite molded article of the present invention.
Figure 3:
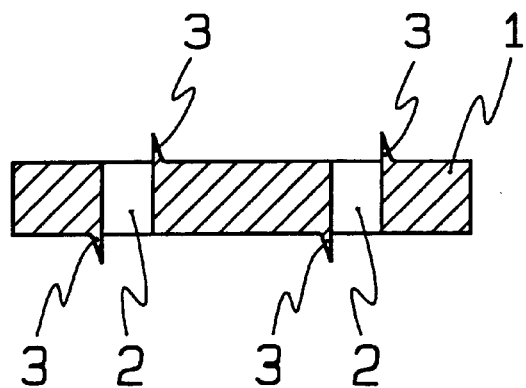
FIG. 3 is a diagrammatic cross-sectional view taken on line X—X in FIG. 2.

As shown in a diagrammatic plan view of FIG. 2 and a diagrammatic cross-sectional view of FIG. 3 which is a view taken on X—X of FIG. 2, a through-hole 2 (2 mm diameter) was punched on a stainless steel sheet 1 (0.3 mm thick) at an interval of about 8 mm to about 10 mm, and a protrusion 3 (about 1 mm high) was provided on the circumference of the through-hole 2.

The porous PTFE sheets (about 1.6 mm thick) were placed on both sides of the stainless steel sheet and a relatively low pressure of about 2 kg·f/cm² was applied to fix the porous PTFE sheets with the protrusions 3. Thus a composite molded article was obtained.

The obtained composite molded article was easy to handle and could be easily inserted into a flange at a joint portion of pipes. Even when a load of 30 kg·f/cm² was applied, there was observed no substantial area change of the porous PTFE sheet. In case of the porous PTFE sheet only, its area was enlarged by about 4.5% with a load of 30 kg·f/cm².

According to the present invention, a porous PTFE molded article having excellent cold flow resistance can be provided. Further by sintering completely after the compression molding, a highly densified PTFE sheet having excellent tensile strength and flex life can be provided.

What we claim is:

1. A porous polytetrafluoroethylene molded article which comprises a porous polytetrafluoroethylene material having a microstructure of nodes interconnected by fine fibrils and has MTS value of from 3,000 to 12,000 psi and C.I. value of from 0.02 to 0.20 g/cc/psi.

2. The porous polytetrafluoroethylene molded article of claim 1, wherein the article has EBP value of from 5 to 16 psi.

3. The porous polytetrafluoroethylene molded article of claim 1, wherein the article is in the form of a sheet and has MTS ratio of within 1.0±0.2 in two directions crossing at a right angle to each other.

4. A composite polytetrafluoroethylene molded article comprising a multilayered article, which comprises a porous polytetrafluoroethylene sheet comprising a porous polytetrafluoroethylene material with a microstructure of nodes interconnected by fine fibrils and having MTS value of from 3,000 to 12,000 psi and C.I. value of from 0.02 to 0.20 g/cc/psi and a perfluorocarbon resin sheet having a dense structure and/or a metal or graphite sheet.

5. The composite polytetrafluoroethylene molded article of claim 4, wherein the EBP value of the porous polytetrafluoroethylene sheet is within the range of 5 to 16 psi.

6. The composite polytetrafluoroethylene molded article of claim 4, wherein MTS ratio of said porous polytetrafluoroethylene sheet in two directions crossing at a right angle to each other is within 1.0±0.2.

7. A highly densified polytetrafluoroethylene sheet obtained by:

pressing a porous polytetrafluoroethylene sheet which comprises a porous polytetrafluoroethylene material having a microstructure of nodes interconnected by fine fibrils and has MTS value of from 3,000 to 12,000 psi and C.I. value of from 0.02 to 0.20 g/cc/psi, and then sintering the pressed sheet at a temperature within a range of not less than the melting point of polytetrafluoroethylene and lower than its thermal decomposition temperature.

8. The highly densified polytetrafluoroethylene sheet of claim 7, wherein MTS ratio of said porous polytetrafluoroethylene sheet in two directions crossing at a right angle to each other is within 1.0±0.2.

9. The highly densified polytetrafluoroethylene sheet of claim 7, wherein said porous polytetrafluoroethylene material is a mixture of polytetrafluoroethylene and modified polytetrafluoroethylene.

10. The highly densified polytetrafluoroethylene sheet of claim 7, which has a specific gravity of 2.10 to 2.25 g/cc.

11. The highly densified polytetrafluoroethylene sheet of claim 7, wherein the porous polytetrafluoroethylene sheet has EBP value of 5 to 16 psi.

12. A highly densified polytetrafluoroethylene sheet obtained by:

pressing a porous polytetrafluoroethylene sheet which comprises a porous polytetrafluoroethylene material having a microstructure of nodes interconnected by fine fibrils and has MTS value of from 3,000 to 12,000 psi and C.I. value of from 0.02 to 0.20 g/cc/psi;

sintering the pressed sheet at a temperature within a range of not less than the melting point of polytetrafluoroethylene and lower than its thermal decomposition temperature; and then re-pressing at a temperature of not less than 280° C.

13. The highly densified polytetrafluoroethylene sheet of claim 12, wherein MTS ratio of said porous molded sheet in two directions crossing at a right angle to each other is within 1.0±0.2.

14. The highly densified polytetrafluoroethylene sheet of claim 12, wherein said porous polytetrafluoroethylene material is a mixture of polytetrafluoroethylene and modified polytetrafluoroethylene.

15. The highly densified polytetrafluoroethylene sheet of claim 12, which has a specific gravity of 2.10 to 2.25 g/cc.

16. The highly densified polytetrafluoroethylene sheet of claim 12, wherein the porous polytetrafluoroethylene sheet has EBP value of 5 to 16 psi.

17. A highly densified polytetrafluoroethylene sheet obtained by heat-pressing a porous polytetrafluoroethylene sheet which comprises a porous polytetrafluoroethylene material having a microstructure of nodes interconnected by fine fibrils and has MTS value of from 3,000 to 12,000 psi and C.I. value of from 0.02 to 0.20 g/cc/psi, at a temperature within a range of not less than the melting point of polytetrafluoroethylene and lower than its thermal decomposition temperature.

18. The highly densified polytetrafluoroethylene sheet of claim 17, wherein MTS ratio of said porous molded sheet in two directions crossing at a right angle to each other is within 1.0±0.2.

19. The highly densified polytetrafluoroethylene sheet of claim 17, wherein said porous polytetrafluoroethylene material is a mixture of polytetrafluoroethylene and modified polytetrafluoroethylene.

20. The highly densified polytetrafluoroethylene sheet of claim 17, which has a specific gravity of 2.10 to 2.25 g/cc.

21. The highly densified polytetrafluoroethylene sheet of claim 17, wherein the porous polytetrafluoroethylene sheet has EBP value of 5 to 16 psi.

* * * * *